United States Patent
Baker et al.

(10) Patent No.: US 9,601,039 B2
(45) Date of Patent: Mar. 21, 2017

(54) VEHICLE FLAG ANCHOR ASSEMBLY

(71) Applicants: Les Baker, Eagle, ID (US); Susie Naylor, Eagle, ID (US)

(72) Inventors: Les Baker, Eagle, ID (US); Susie Naylor, Eagle, ID (US)

( * ) Notice: Subject to any disclaimer, the term of this patent is extended or adjusted under 35 U.S.C. 154(b) by 178 days.

(21) Appl. No.: 14/262,138

(22) Filed: Apr. 25, 2014

(65) Prior Publication Data
US 2015/0310778 A1    Oct. 29, 2015

(51) Int. Cl.
*G09F 17/00* (2006.01)
*B60R 11/00* (2006.01)

(52) U.S. Cl.
CPC .............. *G09F 17/00* (2013.01); *B60R 11/00* (2013.01); *B60R 2011/004* (2013.01); *B60R 2011/0026* (2013.01); *B60R 2011/0071* (2013.01); *G09F 2017/0066* (2013.01); *G09F 2017/0075* (2013.01)

(58) Field of Classification Search
CPC .............. G09F 17/00; G09F 2017/0066; G09F 2017/0075; G09F 21/04; B60R 11/00; B60R 2011/0026; B60R 2011/0071; B60R 2011/004; B60Q 7/00; B60Q 7/005; B60Q 7/02; A63H 27/04
USPC ......... 116/173–174, 28 R, 209; 40/218, 431, 40/556, 591; 248/121, 125.8
See application file for complete search history.

(56) References Cited

U.S. PATENT DOCUMENTS

| | | | | |
|---|---|---|---|---|
| 2,856,814 A | * | 10/1958 | Dillmann | B60R 1/06 248/205.6 |
| 2,908,996 A | * | 10/1959 | Humphrey | A63H 33/40 40/413 |
| 3,273,118 A | * | 9/1966 | Hendershot | B60Q 7/00 116/173 |
| 3,797,450 A | * | 3/1974 | Frisbee | G09F 17/00 116/173 |
| 4,110,818 A | | 8/1978 | Hempsey | |
| 4,619,626 A | * | 10/1986 | Tarulli | A63H 33/00 446/228 |
| 4,640,213 A | * | 2/1987 | Lugo | B63B 35/85 114/252 |

(Continued)

OTHER PUBLICATIONS

Derwent Abstract: JP2002102047A, publication date: Apr. 9, 2002, inventor: Kazuko Miyatake, "Suction Cup".*

(Continued)

*Primary Examiner* — R. A. Smith
*Assistant Examiner* — Tania Courson
(74) *Attorney, Agent, or Firm* — The Keys Law Firm PLLC

(57) ABSTRACT

A vehicle flag anchor assembly for attaching to a vehicle flag assembly for mitigating the risk of the vehicle flag assembly from flying away while the vehicle is moving. The vehicle flag anchor assembly includes securing rings on either end of a string member and an anchor. In operation, the anchor of the vehicle flag anchor assembly is attached to the vehicle window, with one securing ring fastened to an aperture on the anchor and the string member, the securing ring fastened to the aperture in the flag stand and the other end of the string member, forming a chain of connection which secures the vehicle flag assembly to the anchor of the vehicle flag anchor assembly.

11 Claims, 2 Drawing Sheets

(56) References Cited

U.S. PATENT DOCUMENTS

| | | | | |
|---|---|---|---|---|
| 4,807,557 | A * | 2/1989 | Lodisio | G08B 5/02 116/173 |
| 4,900,286 | A * | 2/1990 | Buffalo | A63H 33/00 446/30 |
| 4,962,720 | A * | 10/1990 | Leffel | G09F 17/00 116/173 |
| 5,084,994 | A * | 2/1992 | Elmer | G09F 21/04 40/591 |
| 5,210,970 | A * | 5/1993 | Elmer | G09F 21/04 40/591 |
| 5,232,391 | A * | 8/1993 | Vaughns | A63H 33/00 446/217 |
| 5,339,551 | A * | 8/1994 | Elmer | G09F 21/04 40/591 |
| 5,560,491 | A * | 10/1996 | Romaniuk | G08B 25/12 206/223 |
| 5,692,331 | A * | 12/1997 | Tipke | G09F 21/04 248/205.6 |
| 6,375,143 | B1 | 4/2002 | Burns | |
| 7,748,433 | B2 * | 7/2010 | Huang | B60J 1/2011 160/370.21 |
| 7,878,139 | B1 | 2/2011 | Karnes et al. | |
| 8,146,278 | B1 | 4/2012 | Grant et al. | |
| 9,087,462 | B1 * | 7/2015 | Gallus | G09F 17/00 |
| 2002/0047810 | A1 * | 4/2002 | Chatzipetros | H01Q 1/3275 343/713 |
| 2003/0079392 | A1 | 5/2003 | Newman | |
| 2004/0172872 | A1 * | 9/2004 | Witkowski | G09F 17/00 40/593 |
| 2007/0283875 | A1 * | 12/2007 | Durkin | G09F 17/00 116/173 |
| 2007/0283877 | A1 * | 12/2007 | Durkin | G09F 17/00 116/209 |
| 2009/0165698 | A1 * | 7/2009 | Lapkin | G09F 17/00 116/173 |
| 2010/0264285 | A1 | 10/2010 | Buelna | |
| 2012/0075872 | A1 * | 3/2012 | Byrne | G08B 25/016 362/362 |
| 2012/0161669 | A1 | 6/2012 | Lorentz et al. | |
| 2012/0285364 | A1 | 11/2012 | Kanagy | |
| 2013/0019795 | A1 * | 1/2013 | Leptien | G09F 17/00 116/173 |
| 2014/0174334 | A1 * | 6/2014 | Tucker | G09F 17/00 116/173 |
| 2015/0000587 | A1 * | 1/2015 | Chaney | G09F 17/00 116/173 |

OTHER PUBLICATIONS

Derwent Abstract: CN 204242037 U, publication date: Apr. 1, 2015, inventor: L. Zhou, "Anti-falling flat computer, has connecting wire fixedly connected with hanging rope, where hanging rope is formed with two metal holes that is fixed with climb mountain button, and sucking disk formed with small hole".*

* cited by examiner

VEHICLE FLAG ANCHOR ASSEMBLY

BACKGROUND OF THE INVENTION

Field of the Invention

This invention relates generally to vehicle accessories and, more particularly, to an anchor assembly for attaching a vehicle flag to a car window.

Description of the Prior Art

The construction and use of vehicle flags bearing specified written indicia, such as sports team car flags, is well known. Vehicle flags typically attach to the window of a vehicle through the placement of a flag stand on the edge of the window, with the window then being rolled shut to secure the flag stand on the window. Despite this customary securing system, a problem which still exists is that vehicle flags often fly away while secured on a moving vehicle. This problem may occur because the window has been rolled down, or simply due to the increase in wind pressure from the moving vehicle is strong enough to dislodge the flag stand from the window. Thus, there remains a need for a vehicle flag anchor assembly which would mitigate the risk of a vehicle flag flying away or otherwise becoming separated from the host vehicle. It would be helpful if such a vehicle flag anchor assembly enabled a user to supplement the traditional flag stand attachment with a discrete, secondary attachment device. It would be additionally desirable for the secondary attachment device of such a vehicle flag anchor assembly to be secured to the vehicle on the vehicle interior.

The Applicant's invention described herein provides for a vehicle flag anchor assembly adapted to allow a user to secure a vehicle flag with two discrete structures, one of which being attached to the vehicle's interior. The primary components in Applicant's vehicle flag anchor assembly are a metal ring, a nylon string, and a suction cup. When in operation, the vehicle flag anchor assembly enables a conventional vehicle flag to be more effectively secured to the host vehicle, providing a substantial reduction in the possibility of the flag flying away. As a result, many of the limitations imposed by prior art structures are removed.

SUMMARY OF THE INVENTION

A vehicle flag anchor assembly for attaching to a vehicle flag assembly for mitigating the risk of the vehicle flag assembly from flying away while the vehicle is moving. The vehicle flag assembly is constructed in a similar manner as a conventional vehicle flag except that in some embodiments, its flag stand includes an aperture. The vehicle flag anchor assembly is defined by a flag securing ring, a string member, an anchor securing ring and an anchor. The string member includes the flag securing ring on its distal end and the anchor securing ring on its proximal end. The flag securing ring and the anchor securing are each enclosed ring structures, enabling them be fastened to apertures in the flag stand and the anchor, respectively.

In operation, the anchor of the vehicle flag anchor assembly is attached to the interior side of the window of the host vehicle, with the anchor securing ring is fastened to the aperture on the anchor, one end of the string member fastened to the anchor securing ring, the other end of the string member fastened to the flag securing ring on the exterior of the window, and the flag securing ring fastened to the aperture in the flag stand. This forms a chain of connection which secures the vehicle flag assembly to the anchor of the vehicle flag anchor assembly, preventing the vehicle flag assembly from flying away even if the flag stand's attachment to the vehicle window fails.

It is an object of this invention to provide a vehicle flag anchor assembly which would mitigate the risk of a vehicle flag flying away or otherwise becoming separated from the host vehicle.

It is another object of this invention to provide a vehicle flag anchor assembly which enables a user to supplement the traditional flag stand attachment with a discrete, secondary attachment device.

It is yet another object of this invention for the secondary attachment device of such a vehicle flag anchor assembly to be secured to the vehicle on the vehicle interior.

These and other objects will be apparent to one of skill in the art.

DETAILED DESCRIPTION OF THE INVENTION

Figure 1:
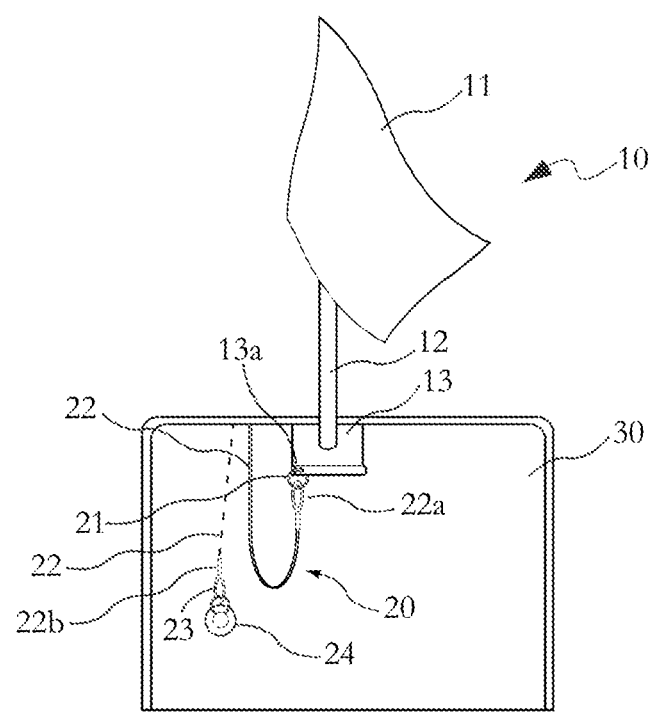
FIG. 1 is a front elevational view of a vehicle flag assembly attached to a vehicle flag anchor assembly built in accordance with the present invention.
Figure 2:
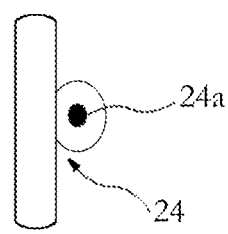
FIG. 2 is a side elevational view of the anchor of a vehicle flag anchor assembly built in accordance with the present invention.

Referring now to the drawings and in particular FIGS. 1 and 2, a vehicle flag assembly 10 attached to a vehicle flag anchor assembly 20 is shown. The vehicle flag assembly 10 is constructed in a similar manner as a conventional vehicle flag, having a flag member 11, a flag pole 12, and a flag stand 13, with the flag stand 13 disposed on one end of the flag pole 12 and the flag member 11 disposed on the end of the flag pole 12 opposite the flag stand 13. The vehicle flag anchor assembly 20 is defined by a flag securing ring 21, a string member 22, an anchor securing ring 23 and an anchor 24. The string member 22 is defined by an elongated strand and includes the flag securing ring 21 on its distal end 22a and the anchor securing ring 23 on its proximal end 22b. The flag securing ring 21 and the anchor securing ring 23 are each enclosed ring structures, enabling them be fastened to apertures in the flag stand 13 and the anchor 24, respectively.

In the preferred embodiment, the flag securing ring 21 and the anchor securing ring 23 are constructed of metal and defined by a double loop structure, similar to key rings, and the string member 22 is defined by a nylon string.

In the preferred embodiment, the anchor 24 is defined by a two inch suction cup having an aperture 24 in its base. In this regard, the anchor 24 is configured to attach to the interior of a car window.

The flag stand 13 of the vehicle flag assembly 10 is modified to include a stand aperture 13a, defined by an aperture in the portion of the body of the flag stand 12 which hangs over the edge of the host vehicle window 30 on the exterior of said window 30. The stand aperture 13a enables the flag stand 13 to engage the vehicle flag anchor assembly 20 by allowing it to receive a hold the vehicle flag anchor assembly 20's flag securing ring 21.

In operation, the anchor 24 of the vehicle flag anchor assembly 20 is attached to the interior side of the window 30 of the vehicle which is to display a desired vehicle flag assembly 10. The anchor securing ring 23 is fastened to the aperture 24a on the anchor 24, and the proximal end 22b of the string member 22 is fastened to the anchor securing ring 23. The string member 22 then extends to and around the edge of the window 30, to the exterior of the window 30. Once on the exterior of the window 30, the string member 22 terminates into the distal end 22a, which is fastened to the flag securing ring 21. With flag securing ring 21 fastened to the stand aperture 13a, a chain of connection is established which secures the vehicle flag assembly 10 to the anchor 24 of the vehicle flag anchor assembly 20. Through its attachment to the anchor 24 of the vehicle flag anchor assembly 20, even if the stand 13 of the vehicle flag assembly 10 becomes dislodged from the window 30, the anchor 24 will prevent the vehicle flag assembly 10 from flying away.

It is contemplated that in the event of a failure of the vehicle flag assembly 10's flag stand 13 attachment, and even if the attachment of the anchor 24 to the window 30 is broken, the string member 22 being wedged in a closed window 30 can prevent the vehicle flag assembly 10 from flying away as long as the window 30 is not rolled down. In addition, in such a circumstance, even if the attachment of the anchor 24 to the window 30 is broken, the structure of the anchor 24 can prevent the vehicle flag assembly 10 from flying away as long as the window 30 is not rolled down enough to enable the anchor 24 to exit the vehicle's interior.

Figure 3:
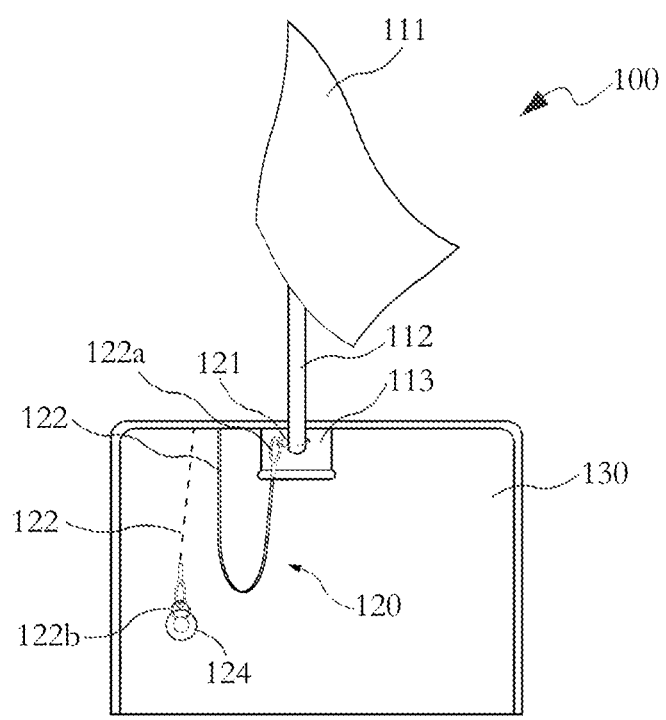
FIG. 3 is a front elevational view of a vehicle flag assembly attached to a vehicle flag anchor assembly built in accordance with an alternate embodiment of the present invention

Referring now to FIG. 3, a vehicle flag assembly 110 attached to an alternate embodiment the vehicle flag anchor assembly 120 is shown. The vehicle flag assembly 100 is again constructed in a similar manner as a conventional vehicle flag, having a flag member 111, a flag pole 112, and a flag stand 113, with the flag stand 113 disposed on one end of the flag pole 112 and the flag member 111 disposed on the end of the flag pole 112 opposite the flag stand 113. The alternate vehicle flag anchor assembly 120 is defined by a flag securing ring 121, a string member 122, an anchor securing ring 123 and an anchor 124. The string member 122 is defined by an elongated strand and includes the flag securing ring 121 on its distal end 122a and the anchor securing ring 123 on its proximal end 122b. The flag securing ring 121 and the anchor securing ring 123 are each enclosed ring structures, enabling the flag securing ring 121 to be secured over the flag pole 112 and the anchor securing ring 123 to be fastened to an aperture in the anchor 124.

In this embodiment, the flag securing ring 121 is secured over the flag pole 112. The flag securing ring 121 can thus be retrofitted on an existing vehicle flag assembly 110 by removing the flag member 111 from the flag pole 112, sliding the flag securing ring 121 on the flag pole 112 and replacing the flag member 111 on the flag pole 112.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A vehicle flag anchor assembly for attaching a vehicle flag assembly to a vehicle, comprising:
    an anchor adapted to be fastened to a host vehicle window;
    a string member connected to said anchor, wherein said string member is additionally configured to be connected to said vehicle flag assembly attached to said host vehicle window;
    an alpha securing ring integral with the proximal end of the string member and adapted to connect said string member to said anchor; and
    a beta securing ring integral with the distal end of the string member and adapted to connect said string member to said vehicle flag assembly by engaging either of a flag stand of the vehicle flag assembly and a flag pole of the vehicle flag assembly.

2. The vehicle flag anchor assembly of claim 1, wherein said alpha securing ring is defined by a metal ring formed into a double loop.

3. The vehicle flag anchor assembly of claim 1, wherein said beta securing ring is defined by a metal ring formed into a double loop.

4. The vehicle flag anchor assembly of claim 1, wherein said beta securing ring is connected to the flag stand of the vehicle flag assembly that is positioned on the opposite side of the host vehicle window from the anchor.

5. The vehicle flag anchor assembly of claim 1, wherein said beta securing ring is connected to the flag pole of the vehicle flag assembly that is positioned on the opposite side of the host vehicle window from the anchor.

6. The vehicle flag anchor assembly of claim 1, wherein said string member is defined by a nylon string.

7. The vehicle flag anchor assembly of claim 1, wherein said anchor is defined by a suction cup having a base and an aperture in its base.

8. A method of anchoring a vehicle flag assembly to a vehicle, comprising the steps of:
    fastening an anchor to an interior surface of a host vehicle window, wherein said anchor is connected to the proximal end of a string member; and
    connecting the distal end of said string member to a portion of said vehicle flag assembly positioned outside of the host vehicle window such that the string member extends to around an edge of the host vehicle window, wherein said vehicle flag assembly is attached to said host vehicle window;
    wherein said anchor is connected to the string member through an alpha securing ring, and
    wherein the step of connecting said string member is performed by attaching a beta securing ring integral with said string member to said vehicle flag assembly and the beta securing ring is adapted to attach to said vehicle flag assembly by engaging either of a flag stand of the vehicle flag assembly and a flag pole of the vehicle flag assembly.

9. The method of claim 8, wherein the step of connecting said string member is performed by attaching the beta securing ring to the flag stand of the vehicle flag assembly.

10. The method of claim 8, wherein the step of connecting said string member is performed by attaching the beta securing ring to the flag pole of the vehicle flag assembly.

11. The method of claim 8, wherein said anchor is defined by a suction cup having a base and an aperture in its base.

* * * * *